United States Patent [19]

Stegherr

[11] Patent Number: 5,005,618
[45] Date of Patent: Apr. 9, 1991

[54] MEANS FOR POSITIONING ARCHED HALVING-JOINTS OF FRAME PORTIONS AND FOR MILLING BEVELS INTO THESE FRAME PORTIONS

[76] Inventor: Ludolf Stegherr, Fabrikstrasse 2, 8413 Regenstauf, Fed. Rep. of Germany

[21] Appl. No.: 315,711

[22] Filed: Feb. 27, 1989

[30] Foreign Application Priority Data

Feb. 26, 1988 [DE] Fed. Rep. of Germany ....... 3806116

[51] Int. Cl.$^5$ ............................................. B27C 5/00
[52] U.S. Cl. ............................ 144/136 R; 144/2 R; 144/133 R; 144/154; 269/63; 269/69; 269/303
[58] Field of Search ................. 144/2 R, 3 R, 136 R, 144/133 R, 153, 154, 371; 269/58, 59, 56, 63, 69, 291, 292, 293, 303

[56] References Cited

U.S. PATENT DOCUMENTS 3,865,161 2/1975 Vizziello et al. ............... 144/136 R
4,223,708 9/1980 Paris, Jr. et al. ............... 144/133 R
4,243,082 1/1981 Paris, Jr. et al. ............... 144/133 R Primary Examiner—W. Donald Bray
Attorney, Agent, or Firm—Hoffman, Wasson & Gitler

[57] ABSTRACT

For positioning and milling halving-joints of arched frame portions a clamping rail is rotatably and movably mounted on a workable. Arresting means associated to the clamping rail engage counter elements of a gauge. Clamping means determine the position of the workpiece for milling trapezoidal bevels. The milling operation is performed by means of a milling tool unit, which is arranged at the working table and is adjustable relative to the workpiece onto different shapes of arches. By means of a separate clamping rail recesses are milled into frame components resp. struts to be inserted into the arches, which are rotatable over a predetermined angle so that the recesses can be adapted to the required shape of bevels within the arched frame portions without requiring different tools for different angles.

3 Claims, 6 Drawing Sheets

FIG. 1
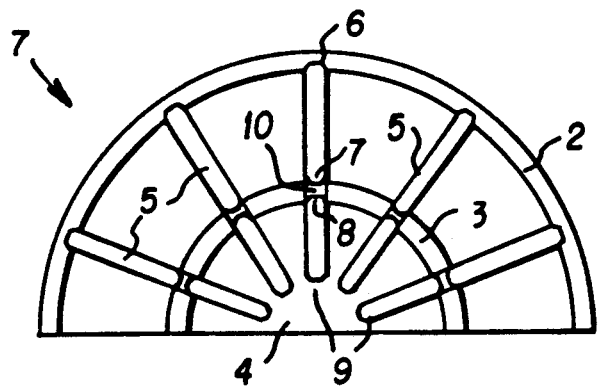
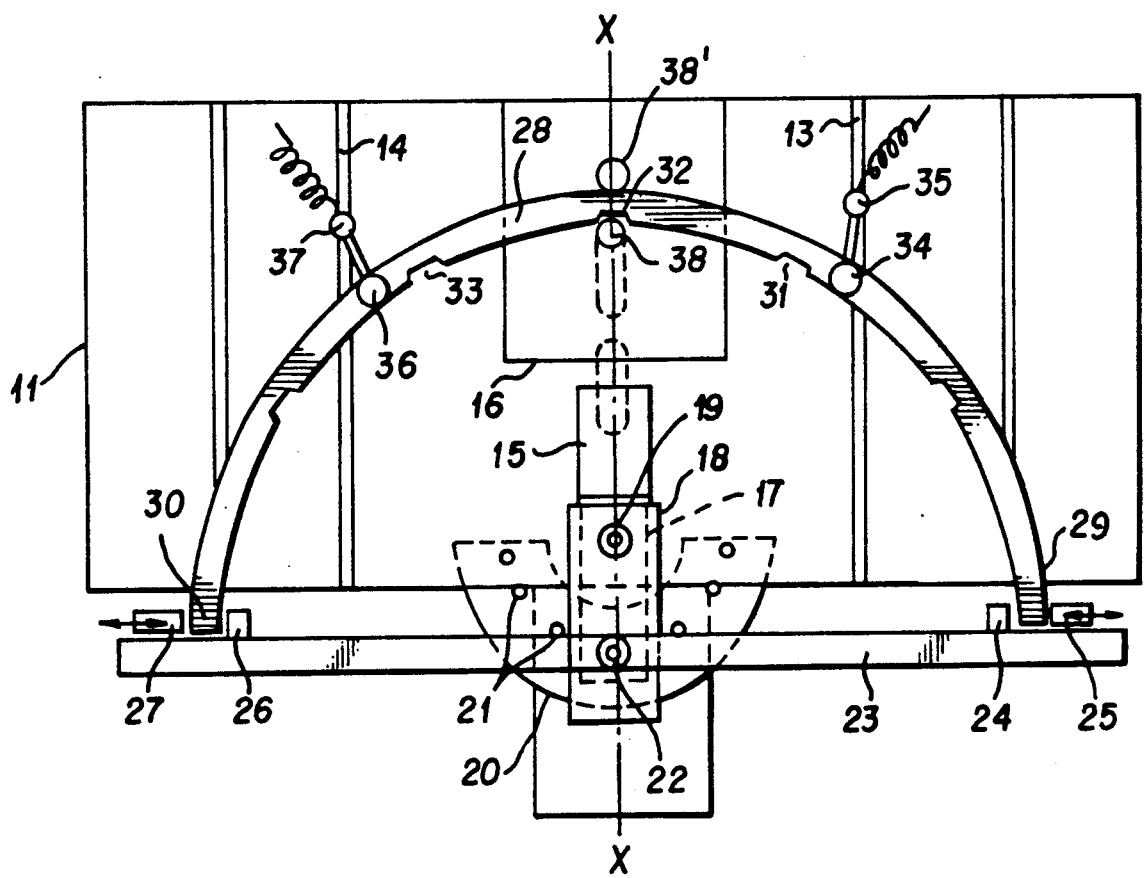
FIG. 2

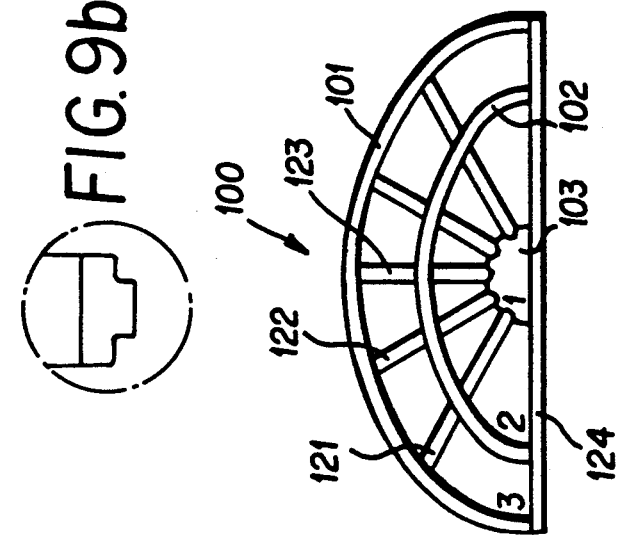
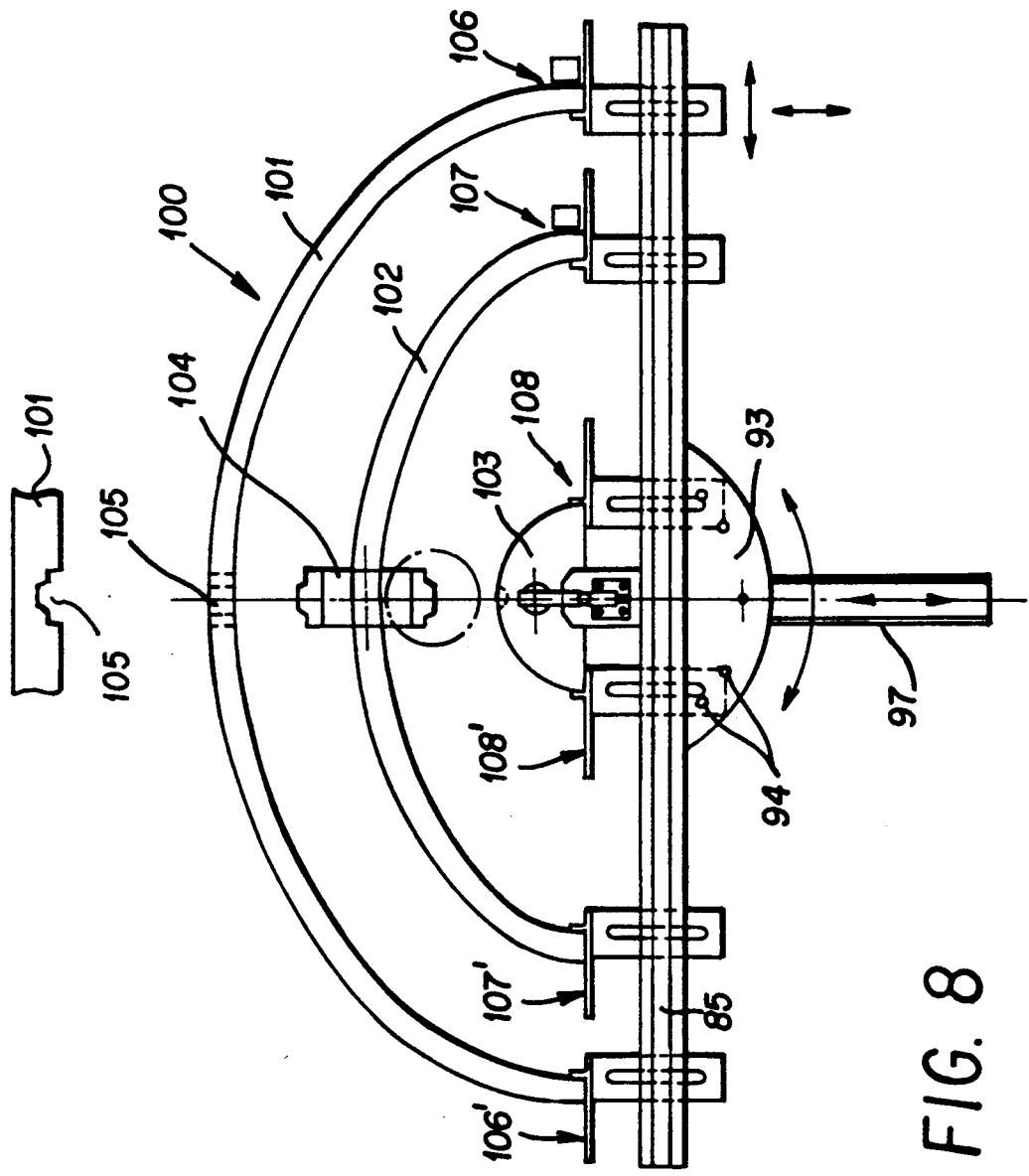

MEANS FOR POSITIONING ARCHED HALVING-JOINTS OF FRAME PORTIONS AND FOR MILLING BEVELS INTO THESE FRAME PORTIONS

BACKGROUND OF THE INVENTION

1. Field of the Invention

This invention refers to the production of halving-joints of arched frame portions made of wood for door arches, window arches, and the like, particularly semi-circular arches, portal arches, elliptical arches and the like of different diameters, and having-joint components for connecting such arches with each other.

2. Description of Prior Art

With curved door and window arches, it is necessary to mill the bevels of these arches, on the inner surface of the outer arch, on the outer and the inner surface of any middle arch, and on the outer surface of the inner arc. These bevels receive the radially extending, recessed straight struts and are symmetrically trapezoidal, to exact dimensions both as to width and height, and as to their location, in order to make sure that the straight strut portions, which extend perpendicular to the arches, fit exactly and snugly into the bevels. The arched frame portions, which are made from a plurality of laminated layers of wood, generally do not maintain their shape when being stored and handled, so that the bevels must be milled individually for obtaining the high degree of exactness necessary for a correct fit and an exact picture of the system of struts.

According to the state of the art, such bevels will be punched, sawn or cut manually sequentially, while the corresponding arched frame portion is clamped and the tool is adjusted manually to the location of the bevel to be machined, or vice versa. This is a rather complicated procedure, which takes quite a long time per bevel and which must be carried out by the operator with considerable attention and skill, if the plurality of bevels is to be made exactly. In those cases, in which the crossing angles between arches and associated struts are different from 90°, the struts at the crossing positions with the arches or alternatively the arches at the location of engagement with the struts necessarily are unsymmetrical in shape, which is caused by corresponding angles different from 90°. According to the state of the art, the trapezoidal bevels within the halving-joints and the straight struts are milled manually or by means of stencils, whereby the basic lines of the two opposite trapezoidal bevels of a strut are parallel to each other and extend in an acute angle to the longitudinal axis of the crossing strut. The strut of the bevels for elliptical arches is different from angle to angle so that for each required angle a different milling tool is required.

SUMMARY OF THE INVENTION

It is an object of this invention to enable one to mill the bevels in arched frame portions of halving-joints, as well as straight struts for connecting arched frame portions of different diameter with each other, in a simple and exact manner mechanically and without adjusting the milling tools when milling all bevels within one frame portion.

It is a further object of this invention to provide an apparatus machining the bevels, which are milled at the periphery of the arched frame portion automatically and exactly in view of their position, graduation and depth.

Furthermore, it is an object of this invention to improve such an apparatus in such a manner that in addition to part-circular arches also elliptical arches of any shape can be machined so that the trapezoidal bevels for receiving the struts as well as the mating trapezoidal recesses within the struts themselves is a simple, repeatable and exact process concerning the angle, without requiring that for different angles different milling tools will be necessary or the tools are to be changed or readjusted.

According to this invention, these objects are solved by the combination of a clamping rail which is fastened to the worktable so that it is rotatable and movable in the plane of the worktable, and which is provided with clamping elements being adjustable in the longitudinal axis of the clamping rail for taking up two opposite arch ends, a gauge which is movably connected with the worktable transverse to the clamping rail and is associated to the clamping rail. Latching means, such as a spring-loaded bolt provided at the clamping rail are engageable with latching positions, such as bores, within said gauge one at a time, and so that the clamping rail together with the workpiece can be rotated over a required graduation step. Clamping means are provided for determining the position of the workpiece in order to mill the bevels or trapezoidal recesses with a milling tool unit comprising at least two milling tools for milling the bevels, which unit is arranged at the worktable and is adjustable to different shapes of arches relative to the workpiece. Pressure rollers are connected with a tool support for engaging the inner or respectively the outer surface of the arch to be milled, which rollers are adjustable with respect to the arch in order to determine the depth of the bevel.

Furthermore, the clamping elements, which are arranged on the clamping rail and which fasten the halving-joint frame portions are adjustably arranged in the direction of and transverse to the longitudinal axis of the clamping rail for positioning and milling arched halving-joint components.

The semi-circular arched workpiece is position in such a manner that the two free ends of the arch are fastened to the clamping rail by means of left and right arresting means, whereby the arch (workpiece) rests upon the worktable. The arresting means each include a stationary and movable stop, which both are adjustable in the direction of the longitudinal axis of the clamping rail. The movable stop can be urged against the stationary stop by spring force. For adjusting the arch, a stop or pressure roller, which is adjustable in radial direction onto the workpiece, engages the curved side (inner or outer side) of the workpiece or arch. This pressure roller is coupled with the milling tool unit and determines the depth of the bevel to be milled into the arch. Furthermore, the arch is positioned by clamping devices, which preferably are operable pneumatically, and act upon the arch from above so that the arch cannot change its position when the bevels are being milled. The clamping rail is rotatably movably supported within the plane of the workpiece upon the worktable; it is rotated (with the tools being stationary) over an angle corresponding the distance of two adjacent bevels. In order to be able to reproduce the extent of rotation exactly and automatically, a gauge is fastened to the worktable or a guiding plate movably attached to the worktable; the gauge is provided with stop locations corresponding to such graduations, which stop locations are engaged by a latching element provided at a clamping rail. In this manner, any measuring of the extent of rotation can be dispensed with so that the operator merely has to rotate the clamping rail over one graduation step from one stop location to the next in order to obtain the exact milling locations at the workpiece.

By replacing the gauge with a different one with different angles of graduation the distances of the milled bevels can be changed. The clamping rail with gauge is arranged on the worktable in such a manner that it is movable vertical to the longitudinal axis of the table so that the clamping rail system as a whole is movable towards and away from the tools in order to machine arches of different diameters or different sizes. The clamping rail is arranged parallel to the longitudinal axis of the worktable in its starting position, and in this position is movable together with the gauge along the transverse axis of the worktable over part thereof; if the clamping rail is rotated around the support position the gauge maintains its position and is not rotated.

The milling tool unit is underneath the recessed plate of the worktable and is movable upwardly for engagement with the workpiece in order to carry out the milling operation. Preferably, the structure of the unit is so that it is formed from two milling tools, which rotate in opposition directions and are arranged in the same plane on behind the other in a radial direction distant from each other and at the same height, with a third lower milling tool arranged centrally between and underneath said two milling tools. The two milling tools arranged at the same level are used for milling the bevels at the inner side of the outer arch and the outer side of the inner arch, namely for milling the bevels resp. trapezoidal recesses in the workpiece, as well as for milling straight halving-joints extending diagonally to each other, whereas the lower milling tool mills the recess into the middle arch, namely a recess for receiving the straight strut or component between the bevels of the middle arch when moving the tool unit upwardly The two tools milling the bevels are adjustable in their distance from each other so that the depth of the bevels can be varied. These two milling tools are movably guided in a horizontal direction and can be connected to arms which are firmly supported within the frame of the milling tool unit at the center of their longitudinal extension and are horizontally adjustable at their lower end each by means of a slot-screw-connection so that the transmission ratio can be 1:1. The tool unit as a whole can be lifted and lowered by a lifting cylinder. The lower milling tool is adjustable in height in order to be able to vary the depth of the recess. The adjustment in height of the lower milling tool can be made so that at the tool unit or at the machine frame revolver means with stops at various heights is provided, which cooperate with corresponding stop rollers at the machine frame or at the tool unit, and actuate a switch, which stops interrupt the vertical movement of the tool unit.

By means of the stops of different heights, which stops themselves are adjustable, various height positions of the lower milling tool are obtained and accordingly different depths of the recesses are adjusted. If no recesses are to be milled, which means if the lower tool is not to come into effect, the adjustment of the height control is made in such a manner that the tool unit performs a limited movement in height, which is required for milling the bevels, whereas if the bevels and recesses are to be milled, which means if all three milling tools are to operate, the entire tool unit is moved over the full stroke of the unit in the vertical direction.

With the apparatus according to this invention it is possible to clamp arched frame portions of different sizes on the worktable centrally with respect to the arch center and to adjust them by means of pressure rollers as stops at the arch in an exact distance from the tool so that the arch in an exact distance from the tool so that the corresponding position of the arch, on which the bevel is to be milled is associated to the tool in a positive manner and in an exact distance allowing the bevels to be milled automatically in an exact manner. Subsequent to the milling of such bevel at the inner side of the outer arch or of a bevel at the outer side and the inner side of the middle arch at the same time as well of the recess at the middle are as a connection between the bevels on the inner and the outer side the clamping rail with the fastened workpiece is rotated over an angular graduation corresponding to the measure between two adjacent positions after having released the clamping means, and subsequent thereto the next bevel is milled; this procedure will be repeated for each bevel is alternativelY each pair of bevels until all bevels are milled within the arch portion. Then, the completed workpiece is removed and the new workpiece is inserted. If this workpiece is of the same dimensions, and if the size and the location of the bevels is unchanged, no further adjustments are required. However, if the workpiece is different in size or shape, or if instead the outer arch the middle arch is to be milled or if an arch of different curvature is to be milled, the clamping elements on the clamping rail are correspondingly shifted and the clamping rail is moved towards the tools to such an extent that the corresponding location of the circumference of the arch, which is to be machined, is exactly in the position of the preceding arch and thus, has the correct position for machining.

When milling the bevels on arched halving-joint frame portions for circular arches and for elliptical arches it is possible according to this invention, by rotating the rail supporting the frame portion around the support position of the rail at the worktable and by moving the rail with the fastened frame portion in the direction toward the tool, to machine the required and (dependent on the angle position) completely different trapezoidal shape of bevels at the frame portion with one and the same milling tool unit. Accordingly, all shapes of arches can be provided with bevels by using a single milling tool unit, and with the same tool unit recesses can be milled into the halving-joints.

For milling bevels within the elliptically arched frame positions, the milling tool unit is provided with a single milling tool, which mills a bevel into the underside only of the elliptical frame portions by moving the clamping rail together with the frame portion fixed thereon in a direction vertical to the rotational axis of the tool. If the clamping rail with the fixed component deviates from the starting position, i.e., if the clamping rail is rotated relative to the gauge, the shape of the bevel automatically will become unsymmetrical. The milling tool profile depends on the corresponding profile of the component, and the bevels within the struts, which connect the individual elliptically arched frame portions in a radial or diagonal direction will be adapted concerning their shape to the bevels within the elliptical frame portions. In order to perform this operation, the clamping rail for taking up the elliptical frame portions will be removed from the worktable and a different clamping rail with a strut fastened thereto is arranged on the table into which strut the bevels on one side or on both sides are milled by means of two identical milling tools arranged in a common plane, which tools are moved upwardly against the strut. The clamping bar is interrupted around the milling tool unit and the two halves are connected by a curved portion, which is fastened to the facing free ends of the two rail halves so that the lower milling tool is not hindered from moving upwardly relative to the clamping rail.

This clamping rail is rotatably supported with the plane of the worktable. The angle of rotation is adjusted on a scale connected with the arch portion and the arch portion is rotatably guided by guiding means on the working table. Within the adjusted position the clamping rail with the strut is fixed by positioning means, and the strut is adjusted by an end stop to the clamping rail which is provided with a distance measuring scale. By rotating the clamping rail together with the strut recesses are milled into the strut with stationary milling tools so that for example in the starting position of the clamping rail symmetrical recesses are milled, which are determined for inserting rectangular, corresponding struts, whereas when rotating the clamping rail unsymmetrical recesses are milled, by means of which a corresponding inclination of the transverse strut in view of the mating crossing strut is obtained.

BRIEF DESCRIPTION OF THE DRAWINGS

In the accompanying drawings,

FIG. 1 is a schematic illustration of a halving-joint frame portion for a door or window arch, FIG. 2 is a plan view of a clamping rail with inserted outer arch portion, FIG. 8 is a schematic plan view of a clamping rail with inserted elliptical arch portions in connection with a milling tool unit, FIG. 9 is a basic picture of an elliptical arch with inserted struts.

DESCRIPTION OF THE PREFERRED EMBODIMENT

Figure 3:
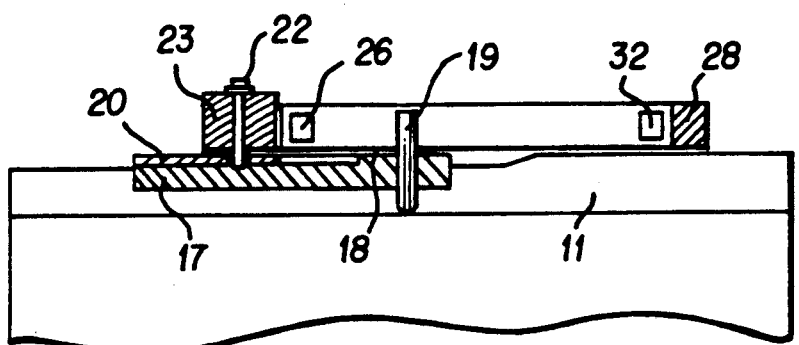
FIG. 3 is a lateral view of a cross section of the arrangement according to FIG. 2, along line X—X.

FIG. 1 shows a door or a window arch 1 made from halving-joint frame portions, which comprises an outer arch portion 2, a middle arch portion 3, an inner arch core 4 as well as straight struts 5 extending radially outwardly from core 4. The arched frame portions 2, 3, 4 have symmetrically trapezoidal bevels 6 on the inner side of the arch 2, corresponding bevels 7 and 8 at the outer and inner side of the arch 3 as well corresponding bevels 9 on the outer side of the arched core 4. Between the bevels 7 and 9 the central bore is provided with a recess 10 so that the straight strut 5, which has a mating recess portion, can be inserted flush with arch 3.

Figure 4:
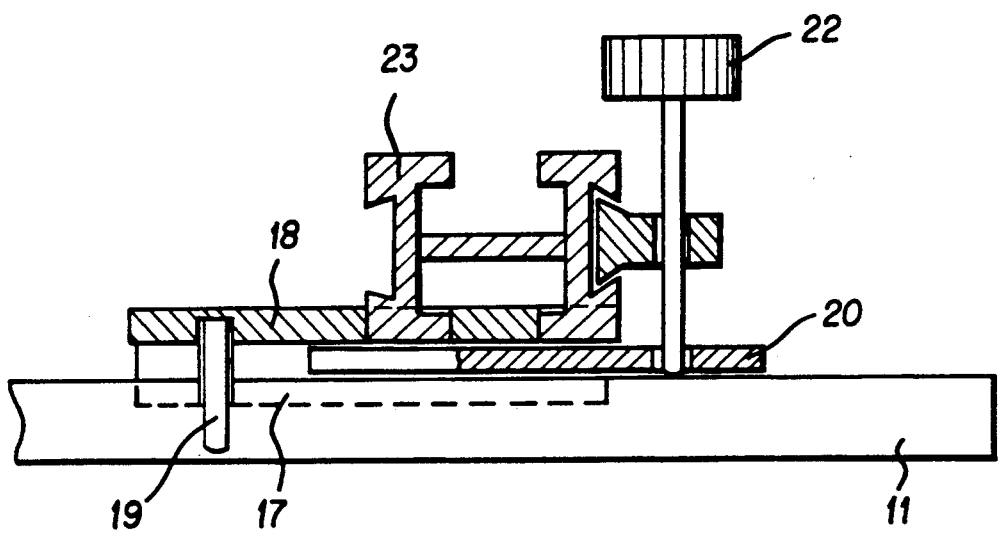
FIG. 4 is a view of the clamping device according to FIG. 3 in more detail.

FIGS. 2, 3 and 4 show the clamping rail system. On plate 11 of a worktable grooves 13, 14 extending parallel to each other are provided for taking up clamping devices 23 by means of which the workpiece is fastened to the plate 11; in addition, a central guiding channel 15 with a widened groove 16 for a tool unit is provided. Guiding channel 15 and groove 16 are separate from each other. A guiding plate 17 is guided within and along channel 15. A support plate 18 situated on top of the guiding plate is rotatably supported together with plate 17 on a bearing 19. A replaceable gauge 20 is inserted in or arranged upon the guiding plate 17, and is provided with stop locations or alternatively bores 21, which are used for receiving a locking element or an arresting bolt 22. This arresting element 22 is mounted on a clamping rail 23 and is passed downwardly through said clamping rail 23 where it locks into or engages one of the bores 21 and accordingly, determines the position of the clamping rail. The clamping rail 23 itself is fixed to the support 18 so that support 18 and clamping rail 23 together are rotatable around the bearing 19 in a plane parallel to the plane of the table and can be moved together with guiding plate 17. The clamping rail is provided as a profiled rail receiving the support plate 18. The arresting element 22, which can be an arresting bolt engaging the corresponding bores 21 of the gauge, is connected to the clamping rail or an extension thereof.

The clamping rail is provided at both sides with a stop 24 adjustable in the longitudinal direction of rail 23, and with an adjustable clamping element 25, which is arranged further outwardly and which is urged towards the corresponding stationary stop 24 either under spring pressure or by means of other clamping elements. One arch end 29 of an arched workpiece 28 is clamped between the stops 24 and 25. With the shown arched workpiece 28 bevels 31, 32, 33 are milled at the inner side thereof, which bevels are symmetrically trapezoidal and are used for receiving the straight halving-joint struts or portions 5 (FIG. 1). For clamping the arched workpiece 28 fastened at the ends 29 and 30 air pressure operated clamping devices 34, 35 36 and 37 are provided, which are movably arranged within the grooves 14, 15 of the support plate and which locate the workpiece during the milling operation. A stop or pressure roller 38 respective 38' is in connection with the inner side or the outer side of the workpiece 28; said roller is adjustable in a radial direction and is mounted to the tool unit so that the distance between the pressure roller 38 respective 38' and the milling tool is predetermined and so that there is guaranteed that with the roller contacting the workpiece a predetermined, exact depth of the bevel 32 will be milled. The distance between pressure roller 38 respective 38' and milling tool is adjustable to different required depths of the bevels. The pressure roller moves upwardly together with the tool unit during the milling operation so that the milling tool is not hindered by the pressure roller.

Figure 5:
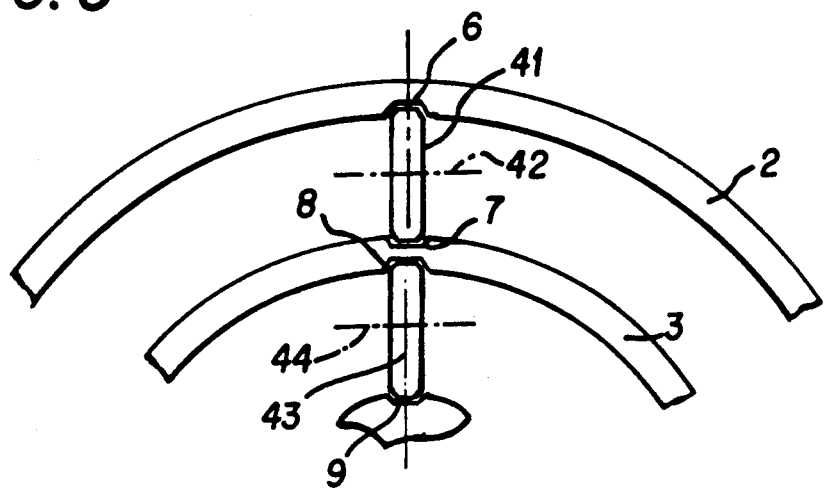
FIG. 5 is a schematic plan view of the work tool unit with outer and middle arch.
Figure 6:
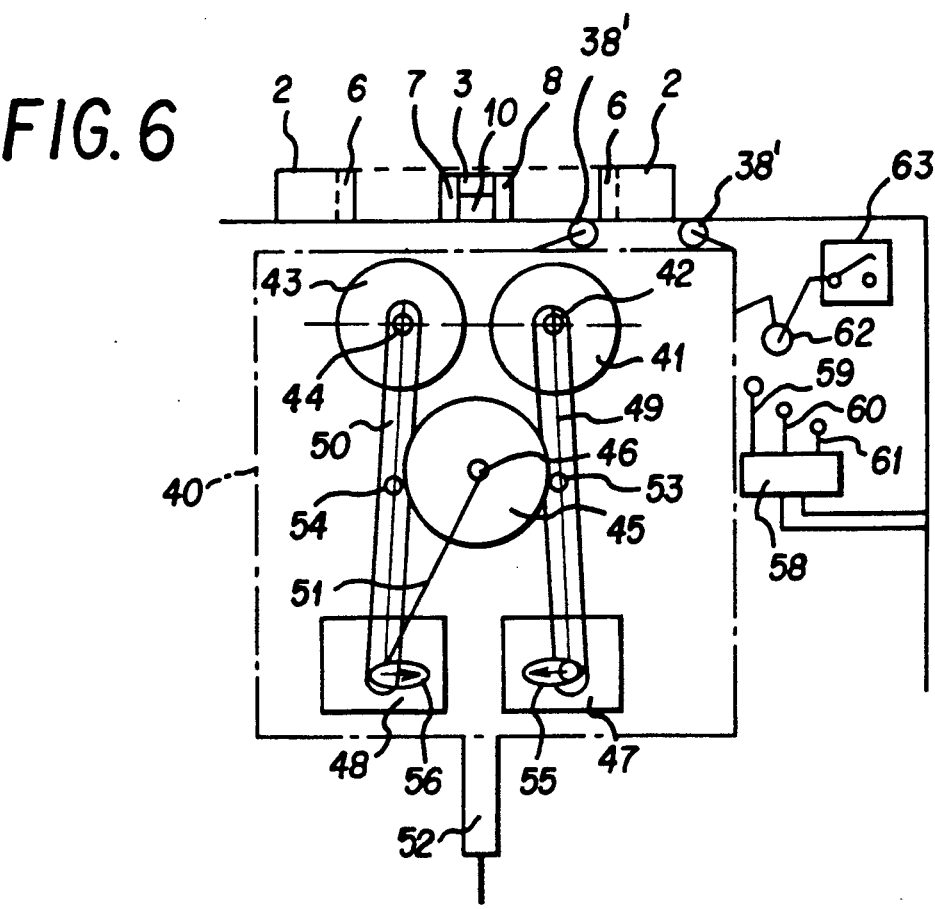
FIG. 6 is a schematic lateral view of the device according to FIG. 5.

The milling tool unit 40 is schematically shown in FIGS. 5 and 6. The two milling tools 41 and 43, which are arranged at the same level and in the same radial plane one behind the other, and which have rotational axes 42 and 44, are used for milling the trapezoidal bevels 32, 6, 7, 8, 9; the third tool 44 with a rotational axis 46 arranged centrally between and underneath the two tools 41 and 43 (axis 46 is extending parallel to the rotational axes 42 and 44) performs the milling operation of the recess (flattening) 10 in one cycle together with milling the trapezoidal bevels, if the entire tool unit 40 is driven upwardly towards and beyond the workpiece. The tools 41 and 43 are driven by electric motors 47, 48; a separate drive can be provided for driving tool 45, however, also one of the drives 47 or 48 can be used. The milling tools 41 and 43 are connected with the driving means 47, 48 by arms 49, 50, whereas tool 45 is connected with driving means 48 by a driving connection 51. The entire tool unit 40 is lifted and lowered by means of a lifting cylinder 52 in the direction of the arrow. An adjustment of the milling tools 41 and 43 in a horizontal direction (direction of the arrow) is performed so that the arms are hingedly arranged at 53 and 54 and are adjustable through adjustment devices 55, 56, whereby the transmission ration is chosen 1:1. These adjustment devices 55 and 56 can be slot-screw-connections.

Pressure roll 38 or 38' is fastened to the milling tool unit 40 so that when lifting said unit 40 into the operating position of the milling tool the roller is lifted beyond the workpiece. Furthermore, a revolver-type adjustment device 58 is mounted at the machine frame the head of which has stops 59, 60, 61 of different height position, which stops engage a starting or butting roller 62 mounted to the tool unit when lifting said unit. The butting roller 62 operates a relay or a switch 63, which switches off the lifting device 52 so that the stroke of unit 40 can be adjusted exactly. In this way, the milling tool 45 can be controlled in height in an exact manner so that the depth of the recess 10 can be adjusted by the tool set 40 up and down. If no recess 10 is to be milled roller 62 is disabled and does not switch.

Figure 7:
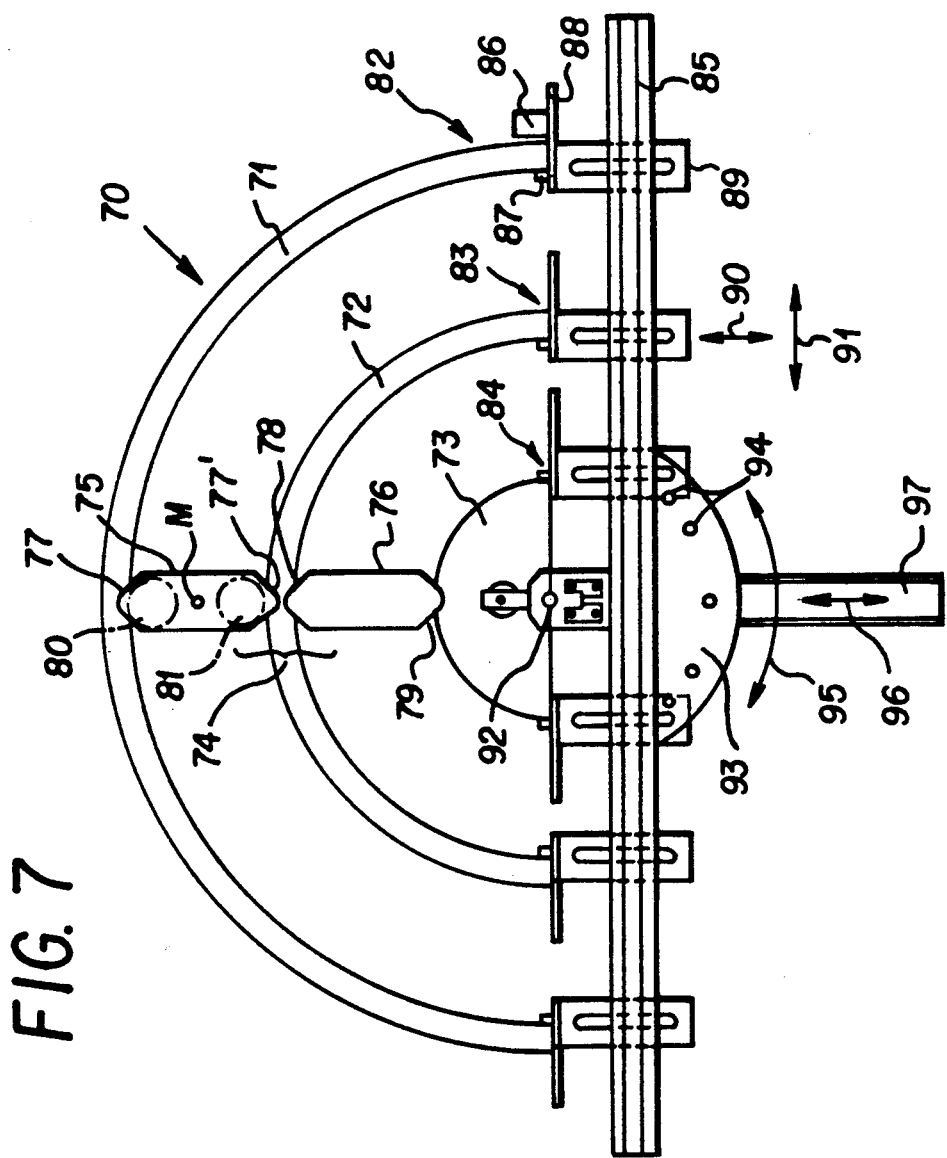
FIG. 7 is a schematic top view of a further embodiment of the invention with a clamping rail with inserted circular arch portions in connection with a milling tool unit.
Figure 13:
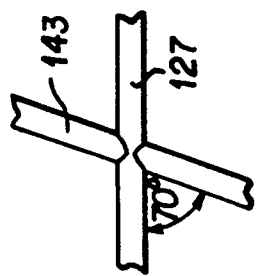
FIG. 13 is a strut having the recess shown in FIG. 12, with an inserted transverse strut.

With the embodiment according to FIG. 7, a circular arch arrangement 70 is shown, which comprises an outer arch portion 71, a middle arch portion 72 and a semi-circular inner portion 73. Item 74 is the milling tool unit, which consists of two milling tools 75 and 76, which both are preferably identical and are arranged with parallel axes in a common plane. By means of the milling tool 75 and bevel 77 is milled within the outer arch portion 71 and a corresponding bevel 77' on the outer side of the middle arch portion 72, whereas the milling tool 76 mills a bevel 78 at the inner side of the middle arch portion 72 and a bevel 79 at the inner portion 73. In order to make sure that the arch portions 71 and 72 have an exact position relative to the milling tools for milling the bevels 77, 77' and 78, pressure rollers 80 and 81 are provided, which are adjustable in a radial direction and are used as stops for the arch portions 71 and 72 being mounted to a clamping rail 85 fastened at the machine frame by means of a clamping devices 82, 83 and 84. The clamping devices 82–84 each consist of a clamping ring 86 and an abutment 87 fastened on a plate 88 which itself is connected to a support 89. Support 89 is movable along the clamping rail 85 (arrow 91) and transverse to the clamping rail (arrow 90) so that arches with different radii can be clamped thereon. For machining reasons, only one arch portion each is milled. With this type of clamping device 82 or 85–89 it is possible to move the corresponding arch portion in a radial direction of the arch relative to the support surface. The corresponding arch portion is rotated around a point of rotation 92 by means of a gauge 93, which is provided with latching means 94, within which the gauge can be rotated over predetermined angle valves and then can be locked. Gauge 93 is fixed to the clamping rail 85 so that when rotating the gauge 93 the clamping rail can be rotated (arrow 95) together with the corresponding arch portion, which is fastened by the clamping device, through the adjusted angle. The gauge 93 with the clamping rail 25 and the workpiece attached thereto also is movable in a radial direction (arrow 96) by means of an extension 97, which is guided on the worktable.

An elliptical arch arrangement 100 shown in FIG. 8 is formed of an outer arch portion 101, a middle arch portion 102 and a semi-circular inner portion 103. Item 104 is a special-type milling tool, which mill bevels 105 exclusively at the underside of the arches, as shown in the little sketch above FIG. 8. The outer arch portion is clamped 106, 106', the middle arch portion 107 and 107' and the inner portion at 108 and 108'. Clamping devices 109, 110 and 111 are similar to clamping devices 82–89 according to FIG. 7. Because the clamping devices and also the structure of the gauge according to FIG. 8 correspond to those of FIG. 7 these parts are not explained again in connection with FIG. 8.

The entire elliptical arch is schematically shown in FIG. 9. The individual arch portions 101, 102 and the middle portion 103 are connected by means of diagonal struts 121, 122 and 123, whereby the struts 123 extend rectangular to the arches 101 and 102, and whereby the bevels within the arches and within the struts are symmetrically arranged, whereas the struts 121 and 122 include an angle different from 90° with the arches 101 and 102, and the bevels within the arches and within the struts are not symmetrical. Above FIG. 9 the profile of the milling tool is schematically shown in an enlarged scale.

Figure 11:
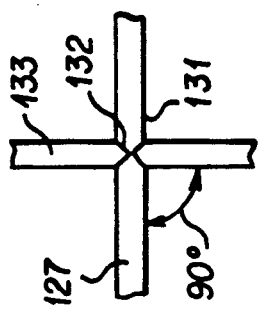
FIG. 11 is a correspondingly milled strut with an inserted crossing strut.

For milling the recess into the struts 121, 122 and 123 the clamping rail 85 with gauge 93 is removed from the plate of the worktable (the milling tool unit is not exchanged), and a different clamping rail 125 is fastened onto the top of the worktable which clamping rail 125 is fastened onto the top of the worktable, which clamping rail is provided with a distance measuring scale 126. A strut 127 is fixed to the clamping rail 125. The milling tool 104 is substituted by a milling tool unit 128 comprising two milling tools 129 and 130, which are arranged in a horizontal plane one behind the other and distant from each other so that when moving the milling tools 129, 130 upwardly the recesses 131 and 132 are milled into the strut 127. These milling tools correspond to the milling tools 75 and 76 according to FIG. 7 so that when altering the system according to FIG. 7 it is not necessary to change the milling tools. The connection between strut 127, in which the recesses 131 and 132 are symmetrically mailed, and a transverse strut 133 arranged at an angle of 90° to strut 127 is schematically shown in FIG. 11. Numeral 134 (in FIG. 10) designates a free space, which divides the clamping rail 125 into two separated sections 135 and 136, both connected with each other by a curved portion 137, which is arranged so that the milling tool 130 can be moved in height scale 138, on which the extent of rotation of the clamping rail 125 and the strut 127 can be adjusted and read. Number 139 indicates a block, which is mounted upon the worktable and which has a guide 140 for the curved portion 137 so that the curved portion 137 has a 141 fastened thereto, which in the starting position of the clamping rail 125 is in engagement with block 139 so that the clamping rail can be returned to the starting position in a simple and precise manner.

Figure 12:
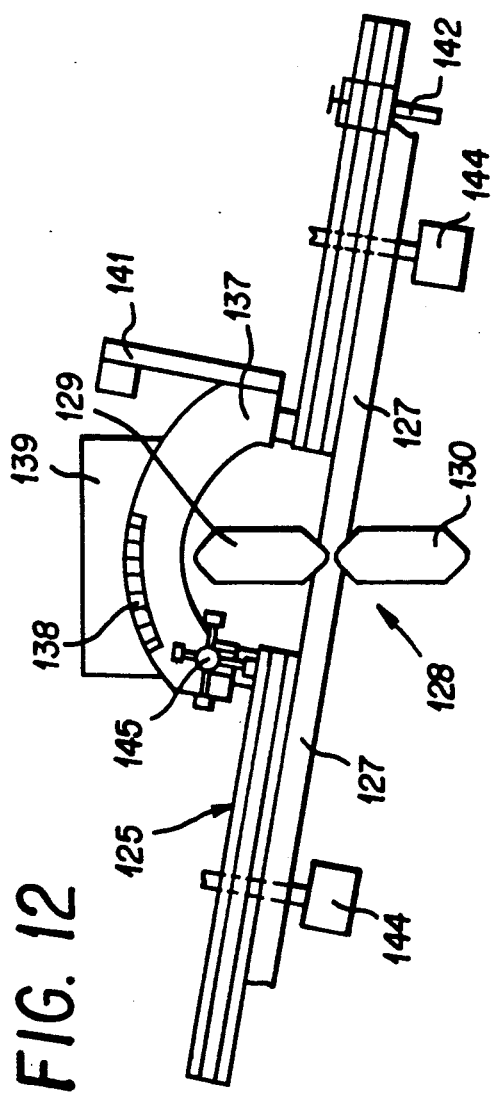
FIG. 12 is the arrangement of FIG. 10 in a position rotated around and angle of 20°.

FIG. 12 shows the clamping rail 125 with strut 127 rotated through an angle of 20° with respect to the milling tool unit 128 and with respect to block 139, so that an asymmetrical recess is milled into the strut 127 and so that the transverse strut 143 can be inserted at an angle of 70° with respect to the clamping rail 127. Two mounting means such as pneumatic adjusters 144 fix the strut 127 to the clamping rail 125. Furthermore, revolver stops 145 are fastened to the curved portion 137, which stops are designed for different thicknesses of the strut and which can be adjusted towards and away from the strut. The curved portion 137 is adjustable (at 146) relative to the rail 125 in a direction towards and away from rail 125.

Figure 14:
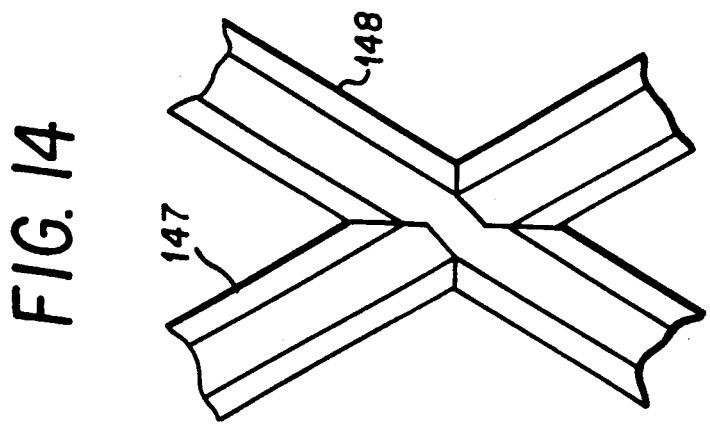
FIG. 14 is a detailed picture of a crossing of two struts machined by using a device according to FIG. 10.
Figure 10:
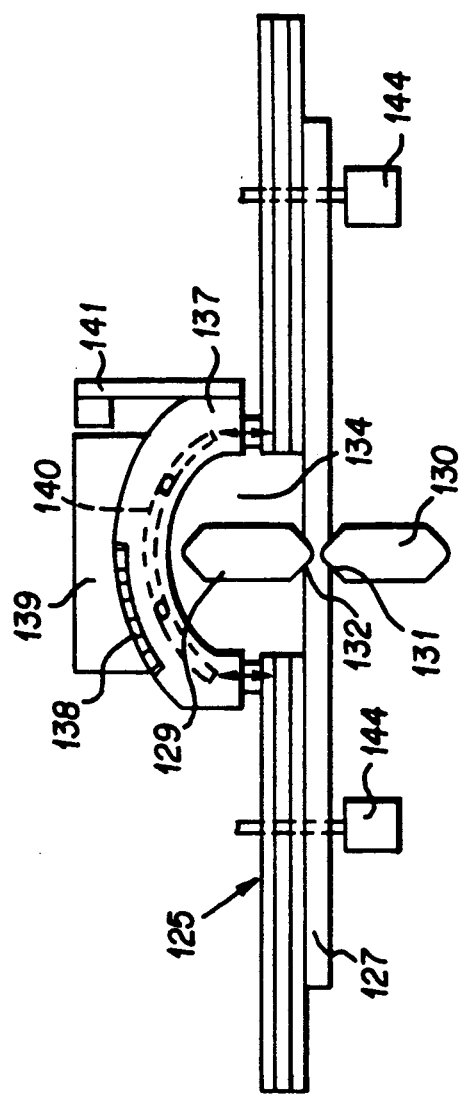
FIG. 10 is a clamping rail for milling the recesses on struts in a starting position.

In FIG. 14 a halving-joint arrangement is shown in detail from which the connection between the transverse strut 147 and the longitudinal strut 148 can be seen, if the recesses have been machined by a device according to FIG. 10 or 12 with corresponding rotation of the clamping rail 125.

I claim:
1. An apparatus for positioning and milling arched halving-joint frame portions, which allow the milling of bevels into the inner and the outer surfaces of arches of window frames, door frames, which bevels are formed for receiving straight formed for receiving straight transverse struts, and the milling or recesses into said struts for connecting the arched frame portions with each other, said means comprising
    a) a clamping rail which is fastened to the worktable so that it is rotatable and movable within the plane of the worktable, and which is provided with clamping elements being adjustable in the longitudinal axis of the clamping rail for taking up the two opposite arch ends,
    b) a gauge, which gauge is movably connected with the working table transverse to the clamping rail and is connected to the clamping rail so that latching means, such as a spring-loaded bolt, provided at the clamping rail is engageable with latching points, such as bores within said gauge one at a time, and so that the clamping rail together with the workpiece can be rotated over the required graduation step,
    c) clamping means for determining the position of the workpiece in order to mill the bevels,
    d) a milling tool unit comprising at least two milling tools for tool unit comprising at least two milling tools for milling the bevels, which unit is arranged at the worktable and is adjustable to different shapes of arches relative to the workpiece, and
    e) pressure roller means connected with a tool support for engaging one surface of the arch to be milled, which roller means is adjustable relative to the arch in order to determine the depth of the bevel.

2. The invention of claim 1, further comprising clamping elements provided on the clamping rail for fastening the halving-joint frame portions, said clamping elements being adjustable in the direction of and transverse to the longitudinal axis of the clamping rail.

3. The invention of claim 1, further comprising stop means, such as pressure rollers, which is connected with the tool support, is rotatable around a point of rotation between the outer and the middle arch for engaging the inner or outer surface of the arch to be milled, and is adjustable in a radial direction.

* * * * *